(12) United States Patent
Wood et al.

(10) Patent No.: US 6,635,714 B1
(45) Date of Patent: Oct. 21, 2003

(54) WEATHERABLE FLUOROPOLYMER-ACRYLIC COMPOSITION

(75) Inventors: Kurt A. Wood, Abington, PA (US); Lofti Hedhli, King of Prussia, PA (US); Sylvia Vicini, Genoa (IT); Stephane Moyses, Audobon, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 3 days.

(21) Appl. No.: 10/135,670

(22) Filed: Apr. 30, 2002

(51) Int. Cl.$^7$ .................. C08L 27/12; C08L 33/04; C08L 35/02
(52) U.S. Cl. ...................... 525/199; 525/222
(58) Field of Search .................. 525/199, 222

(56) References Cited

U.S. PATENT DOCUMENTS

| | | | | |
|---|---|---|---|---|
| 5,322,899 A | * | 6/1994 | Grunewalder et al. | 525/199 |
| 5,599,873 A | * | 2/1997 | Verwey et al. | 524/545 |
| 5,646,201 A | | 7/1997 | Araki et al. | 523/201 |

FOREIGN PATENT DOCUMENTS

EP     0 960 918     12/1999

* cited by examiner

Primary Examiner—Nathan M. Nutter
(74) Attorney, Agent, or Firm—William D. Mitchell

(57) ABSTRACT

Weatherable fluoropolymer-acrylic compositions based on the use of C3 and higher straight chain (meth)acrylate esters are provided.

7 Claims, No Drawings

WEATHERABLE FLUOROPOLYMER-ACRYLIC COMPOSITION

BACKGROUND OF THE INVENTION

This invention relates to an improved fluoropolymer-acrylic composition having enhanced weathering properties, particularly to such compositions wherein the fluoropolymer component is made by the polymerization of vinylidene fluoride and, optionally, other perhalogenated monomers and wherein the acrylic component is made by the polymerization of predominantly acrylate and/or methacrylate esters, the improvement residing in the use of (meth)acrylate esters containing 10–50 weight % of straight chain meth(acrylate) esters having at least 3 carbons in the side chain and 50–90 weight % of methyl and/or ethyl (meth)acrylate esters. This composition is useful as a weatherable component of coatings, films and other manufactured articles.

Fluoropolymer-acrylic blends, including those referred to in the art as acrylic-modified fluoropolymers or AMF, are described in the patent literature, but teach that the preferred acrylic component to achieve good weatherability is based on methyl or ethyl (meth)acrylate. Representative of such patent art is U.S. Pat. No. 5,646,201 and EP 960918. These lower alkyl (meth)acrylates are believed to enhance the compatibility of the fluoropolymer and acrylic components, whereas the higher chain esters are believed to result in incompatibility and poor weatherability.

Testing of resistance to UV radiation is used herein as a measure of weatherability of the inventive compositions. Thus, in the examples below, the procedure of ASTM G53-88 was followed to measure the acrylic weight loss for coatings made from the inventive compositions and show that the amount of acrylic degradation is much lower than for a comparative example using (meth)acrylate esters having side chains with only 1–2 carbons.

BRIEF SUMMARY OF THE INVENTION

An improved fluoropolymer-acrylic composition with enhanced weathering properties is provided in which the fluoropolymer component is made by the polymerization of vinylidene fluoride and, optionally, other perhalogenated monomers and in which the acrylic component is made by the polymerization of predominantly acrylate and/or methacrylate esters, the improvement comprising using acrylate and/or methacrylate esters containing 10 to 50 weight % of straight chain (meth)acrylate esters having at least 3 carbons in the side chain and 50 to 90 weight % of straight chain (meth)acrylate esters having 1 or 2 carbons in the side chain.

DETAILED DESCRIPTION

As noted above, it has now been found that the key to improved weathering properties (as measured by resistance to UV radiation) is the use of 10–50 weight % of C3 and higher linear meth(acrylate) esters (preferably C3–C8 linear esters such as butyl or propyl acrylate or methacrylate) as part of the acrylic component of the inventive composition. Thus, the acrylic component is made by the polymerization of predominantly (meth)acrylate esters which contain the foregoing C3 and higher linear esters, 50–90 weight % of methyl and/or ethyl (meth)acrylate, and 0–20 weight % of other monomers such as methacrylic or itaconic acid, hydroxyethyl acrylate or methacrylate, carbonyl or acetoacetate functional monomers, various alkoxysilane methacrylates or acrylates, vinyl esters, vinyl ethers and styrene. An example of a preferred acrylic composition is 20–32% butyl acrylate, 65–80% methyl methacrylate and 2–10% of one of the other foregoing functional monomers.

While applicant does not wish to be bound by any mechanism responsible for the improved weatherability resulting from use of C3 and higher linear (meth)acrylates, it is possible that the degradation mechanism is different for the lower, C1 and C2 (meth)acrylates as compared to the longer chain materials. The former materials are believed to degrade by chain scission, the latter by crosslinking.

Possible uses of the invention include coatings, paints, films, and extruded articles (including the outermost layer of a multilayer extruded object). Thus, for instance, it can be used as the principal component of a weatherable latex paint as shown in the examples below. The composition of the invention can be made into paints, coatings, varnishes or films by various routes well known in the coatings industry, each of which is an embodiment of the invention.

In a first embodiment, the composition of the invention is made as a latex dispersion prepared by seeded emulsion polymerization. These methods are well known in the art such as is shown in U.S. Pat. No. 5,646,201. Preferably the composition contains at least 30 weight % fluoropolymer, more preferably 50–90% fluoropolymer, most preferably 65–80% fluoropolymer. The fluoropolymer is preferably a copolymer of vinylidene fluoride (VDF) and a perhalogenated monomer such as hexafluoropropylene (HFP), chlorotetrafluoroethylene (CTFE) or tetrafluoroethylene (TFE). The level of comonomer is adjusted such that the resulting copolymer preferably has an enthalpy of melting less than about 35 Joules per gram (J/g), most preferably 5–20 J/g. In another preferred latex dispersion embodiment, the fluoropolymer has no detectable crystalline melting peak.

In a second embodiment of the invention, a coating or film is made using a solvent dispersion formulation. In this embodiment, the resin binder is comprised of about 20–90% fluoropolymer (preferably 40–80%, most preferably 50–75%), among the preferred fluoropolymers being a polyvinylidene fluoride (PVDF) homopolymer, most preferably a fine powder such as KYNAR® 301F (an air-milled powder form having a melting point of 160–170° C. available from Atofina Chemicals, Inc.), or a VDF-based copolymer, with the remainder being predominantly comprised of an acrylic resin of the invention composition, that is, with 10–50 wt. % of straight chain meth(acrylate) esters, preferably at least 80% of the remainder being an acrylic of this composition.

In a third embodiment of the invention, a coating or film is made using a waterborne dispersion formulation of similar composition to the second embodiment, formed by combining an acrylic latex of the inventive composition with a fluoropolymer in aqueous dispersion, the fluoropolymer being either in latex form or in the form of a redispersed powder. Examples of preferable PVDF fluoropolymers for this embodiment include latex products such as LATEX 32 (melting point 160–170° C.) and air-milled powders such as KYNAR 741F (melting point 165–170° C.), both PVDF homopolymers being available from Atofina Chemicals, Inc.

In a fourth embodiment, a coating or film is made using a solvent-based solution formulation of similar composition to those described in the first and second embodiments. This embodiment uses, preferably, a low crystallinity fluoropolymer, more preferably a terpolymer of VDF, TFE and HFP or CTFE. One example of such a terpolymer is KYNAR 9301 (melting point of 90° C.), available commercially from Atofina Chemicals, Inc.

In a fifth embodiment, a coating or film with the inventive composition as the principal resin component is applied as a powder coating. Examples of some of the ways to produce PVDF powder coatings according to this embodiment are taught in U.S. Pat. No. 5229460; 4770939; 5030394; 5739202; 6063855 and 6340720, as well as in European Patents 659845 and 659851. Preferred fluoropolymers for this embodiment are PVDF homopolymers or VDF-based copolymers with a melt viscosity below 20 kPs (100 sec$^{-1}$ at 230° C.), most preferably below 10 kPs. An example of such a low melt viscosity homopolymer is KYNAR 710, available commercially from Atofina Chemicals, Inc.

Yet another embodiment is a solid material of the inventive composition, for example, a caulk, solid foam, or extruded or molded article of similar composition to the first embodiment.

The invention is illustrated in the following examples in which coatings were made from three fluoropolymer-acrylic compositions, each in aqueous latex form at 48 wt% solids, where the solids of the latex are comprised of a 70:30 ratio of fluoropolymer to acrylic in which the fluoropolymer is a copolymer of 75% VDF and 25% HFP. All parts and percentages are by weight unless otherwise indicated. Examples 1 and 2 had an acrylic composition of 77 MMA/ 20 BA/3 MAA and 65 MMA/31 BA/4 MAA, while a Comparative Example had an acrylic composition of 67 MMA/26 EA/7 MAA, where by MMA is methyl methacrylate, BA is butyl acrylate, MAA is methacrylic acid and EA is ethyl acrylate. Coating formulations were then made by mixing the fluoropolymer-acrylic compositions with about 1 part per 100 of ammonia (7%) and about 10 parts per 100 of a mixture of about 84% dipropylene glycol methyl ether, 11% 2,2,4-trimethyl-1,3-pentanediol monoisobutyrate and 5% of a hydrophobically modified ethoxylate urethane thickener. Coatings were applied on chromated aluminum test panels with a draw down bar (200 micron gap). The panels were air-dried overnight, then conditioned at 60° C. for 5 days in an oven before exposure to a QUV-B test unit equipped with UVB-313 lamps for accelerated weather testing according to ASTM G53–88. The clear coats dry film thickness was about 30–40 microns. The panels were cut to a size of approximately 15 cm×8 cm. The area exposed to radiation was roughly 9 cm×6 cm. The total exposure time for the samples was 2428 hours. The acrylic weight loss for the clear coats made from the Example 1 and 2 compositions was only about 5–10%, while the weight loss for the clear coat made from the Comparative Example composition was greater than 30%.

What is claimed is:

1. A fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising acrylate and/or methacrylate esters containing 10 to 50 weight % of straight chain (meth) acrylate esters having at least 3 carbons in the side chain and 50 to 90 weight % of straight chain (meth)acrylate esters having 1 or 2 carbons in the side chain.

2. A coating made from a latex dispersion of a fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising using acrylate and/or methacrylate ester containing 10 to 50 weight % of straight chain (meth) acrylate esters having at 3 carbon in the side chain and 50 to 90 weight % of straight chain (methacrylate esters having 1 or 2 carbon in the side chain.

3. A coating made from a solvent dispersion of a fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising using acrylate and/or methacrylate esters containing 10 to 50 weight % of straight chain (meth) acrylate esters having least 3 carbons in the side chain and 50 to 90 weight % of straight chain (meth)acrylate esters having 1 or 2 carbons in the side chain.

4. A coating made from a waterborne dispersion of a fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising using acrylate and/or methacrylate esters containing 10 to 50 weight % of straight chain (meth) acrylate esters having at least 3 carbons in the side chain and 50 to 90 weight % of straight chain (meth)acrylate esters having 1 or 2 carbons in the side chain.

5. A coating made from a solvent-based solution of a fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising using acrylate and/or methacrylate esters containing 10 to 50 weight % of straight chain (meth) acrylate esters having at least 3 carbons in the side chain and 50 to 90 weight % of straight chain (meth)acrylate esters having 1 or 2 carbons in the side chain.

6. A powder coating made using as the principal resin component a fluoropolymer-acrylic composition with enhanced weathering properties in which the fluoropolymer component is made by the polymerization of vinylidene fluoride and, optionally, other perhalogenated monomers and in which the acrylic component is made by the polymerization of predominantly vat and/or me acrylate esters, the composition comprising using acrylate and/or methacrylate esters containing 10 to 50 weight % of straight chain (meth)acrylate esters having at least 3 carbons in the side chain and 50 to 90 weight % of straight chain (meth)acrylate esters having 1 or 2 carbons in the side chain.

7. A solid material of a fluoropolymer-acrylic composition with enhance weathering properties in which the fluoropolymer component is made by the polymerization of vinylidene fluoride and, optionally, other perhalogenated monomers and in which the acrylic component is made by the polymerization of predominantly acrylate and/or methacrylate esters, the composition comprising using acrylate and/or methacrylate esters containing 10 to 50 weight % of straight chain (meth)acrylate esters having at least 3 carbons in the side chain and 50 to 90 weight % of straight chain (meth) acrylate esters having 1 or 2 carbons in the side chain, the solid material being the form of a caulk, solid foam, or extruded or molded article.

* * * * *